(12) United States Patent
Jones et al.

(10) Patent No.: US 11,683,188 B2
(45) Date of Patent: Jun. 20, 2023

(54) REPRESENTING CERTIFICATE EXPIRATION WITH TIME-BASED INTERMEDIATE CERTIFICATE AUTHORITIES

(71) Applicant: Google LLC, Mountain View, CA (US)

(72) Inventors: Matthew Robert Jones, Lake Forest Park, WA (US); Benjamin Jackson Benoy, Redmond, WA (US); John David Thayer Wood, Duvall, WA (US)

(73) Assignee: Google LLC, Mountain View, CA (US)

( * ) Notice: Subject to any disclaimer, the term of this patent is extended or adjusted under 35 U.S.C. 154(b) by 318 days.

(21) Appl. No.: 17/069,178

(22) Filed: Oct. 13, 2020

(65) Prior Publication Data
US 2022/0116229 A1  Apr. 14, 2022

(51) Int. Cl.
*H04L 9/32* (2006.01)
*H04L 9/08* (2006.01)
*H04L 9/00* (2022.01)

(52) U.S. Cl.
CPC .......... *H04L 9/3268* (2013.01); *H04L 9/0869* (2013.01); *H04L 9/3247* (2013.01); *H04L 9/3265* (2013.01); *H04L 9/50* (2022.05)

(58) Field of Classification Search
None
See application file for complete search history.

(56) References Cited

U.S. PATENT DOCUMENTS

| | | | | |
|---|---|---|---|---|
| 2004/0128504 A1* | 7/2004 | Kivinen | ................ | H04L 9/3268 713/158 |
| 2006/0200661 A1* | 9/2006 | Doonan | ................ | H04L 9/3297 713/156 |
| 2017/0295025 A1* | 10/2017 | Meriac | ................ | H04L 63/0823 |
| 2020/0136838 A1* | 4/2020 | Kucharski | ............. | H04L 9/3265 |

FOREIGN PATENT DOCUMENTS

WO   WO-2006043262 A2 *  4/2006  .......... H04L 63/064

* cited by examiner

*Primary Examiner* — Noura Zoubair
*Assistant Examiner* — Mayasa A. Shaawat
(74) *Attorney, Agent, or Firm* — Honigman LLP; Brett A. Krueger

(57) ABSTRACT

A method for representing certificate expiration includes obtaining, from a root certificate authority, a root digital certificate and generating a chain of intermediate certificate authorities. Each intermediate certificate authority includes a respective intermediate certificate digitally signed by the intermediate certificate authority that is immediately higher in the chain and a respective validation time period indicating a range of times when the intermediate certificate authority is permitted to digitally sign certificates. The respective validation time period includes the validation time period of each intermediate certificate authority that is lower in the chain. The method includes generating a certificate revocation list and generating, from the lowest intermediate certificate authority in the chain, a plurality of end entity certificates. The method includes, after the respective validation time period of the lowest intermediate cer- (Continued)

tificate authority in the chain has elapsed, adding, to the certificate revocation list, one or more of the plurality of end entity certificates.

22 Claims, 13 Drawing Sheets

| Label 610 | Path 620 | Encoded Path 630 |
|---|---|---|
| Switch_CA | {} | [0] |
| 2020 | {2020} | [1] [2020] |
| Q1 | {2020,Q1} | [2] [2020] [1] |
| Jan | {2020,Q1,Jan} | [3] [2020] [1] [1] |
| Week 1 | {2020,Q1,Jan,Week 1} | [4] [2020] [1] [1] [1] |
| Day 1 | {2020,Q1,Jan,Week 1,Day 1} | [5] [2020] [1] [1] [1] [1] |

FIG. 6

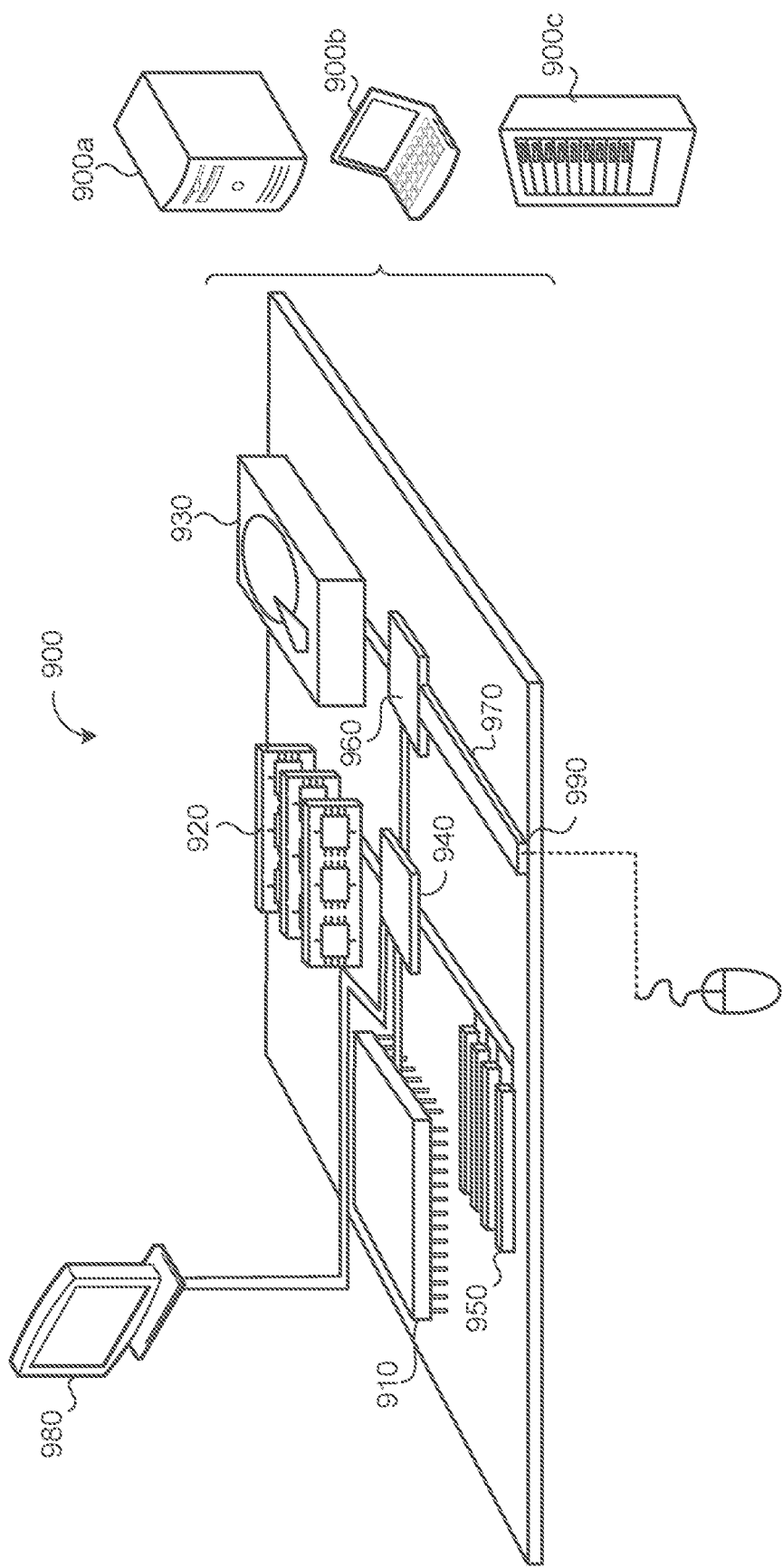

REPRESENTING CERTIFICATE EXPIRATION WITH TIME-BASED INTERMEDIATE CERTIFICATE AUTHORITIES

TECHNICAL FIELD

This disclosure relates to representing certificate expiration with time-based intermediate certificate authorities.

BACKGROUND

Digital certificates are electronic documents commonly used to establish ownership of a public key over a network. Once ownership of the public key is established for a particular user or entity, the public key is used to securely communicate with the user or entity. Digital certificates commonly have embedded time-based expirations that limit a period of validity of the digital certificate. After the period of validity has expired, the certificate is no longer valid. This requires that each device that receives a certificate from a purported owner of a public key associated with the certificate has a reliable clock in order to compare the current time and the period of validity. Digital certificates may also be revoked prior to their scheduled expiration date through the use of a certificate revocation list.

SUMMARY

One aspect of the disclosure provides a method for representing certificate expiration with time-based intermediate certificate authorities. The method includes obtaining, at data processing hardware, from a root certificate authority, a root digital certificate digitally signed by the root certificate authority. The method also includes generating, by the data processing hardware, a chain of intermediate certificate authorities. Each respective intermediate certificate authority in the chain of intermediate certificate authorities includes a respective intermediate certificate digitally signed by the intermediate certificate authority or the root certificate authority that is immediately higher in the chain of intermediate certificate authorities than the respective intermediate certificate authority and a respective validation time period indicating a range of times when the respective intermediate certificate authority is permitted to digitally sign intermediate certificates and end entity certificates. The respective validation time period of the respective intermediate certificate authority includes the validation time period of each intermediate certificate authority that is lower in the chain of intermediate certificate authorities than the respective intermediate certificate authority. The method also includes generating, by the data processing hardware, a certificate revocation list for the chain of intermediate certificate authorities. The method also includes generating, by the data processing hardware, from the lowest intermediate certificate authority in the chain of intermediate certificate authorities, a plurality of end entity certificates. Each end entity certificate of the plurality of end entity certificates is digitally signed by the lowest intermediate certificate authority in the chain of intermediate certificate authorities. The method also includes, after the respective validation time period of the lowest intermediate certificate authority in the chain of intermediate certificate authorities has elapsed, adding, by the data processing hardware, to the certificate revocation list, one or more of the plurality of end entity certificates generated from the lowest intermediate certificate authority in the chain of intermediate certificate authorities.

Implementations of the disclosure may include one or more of the following optional features. In some implementations, when every end entity certificate digitally signed by a respective intermediate certificate authority in the chain of intermediate certificate authorities has been added to the certificate revocation list and the current time is at or after an end of the respective validation time period of the respective intermediate certificate authority, the method includes removing, by the data processing hardware, each of the plurality of end entity certificates from the certificate revocation list and adding, by the data processing hardware, the respective intermediate certificate associated with the respective intermediate certificate authority to the certificate revocation list. In some examples, the method includes, after the respective validation time period associated with a respective intermediate certificate authority in the chain of intermediate certificate authorities has elapsed, generating, by the data processing hardware, another intermediate certificate authority associated with a validation time period having a same duration as the validation time period associated with the respective intermediate certificate authority. The method may also include replacing, by the data processing hardware, the respective intermediate certificate authority with the other intermediate certificate authority in the chain of intermediate certificate authorities. The method may also include, after replacing the respective intermediate certificate authority with the other intermediate certificate authority, generating, by the data processing hardware, an end entity certificate digitally signed by the other intermediate certificate authority and not digitally signed by the respective intermediate certificate authority.

Optionally, each validation time period is associated with one of a day, a week, a month, a quarter, or a year. In some implementations, each end entity certificate does not have an expiration time, in some examples, the method includes determining, by the data processing hardware, that a respective end entity certificate of the plurality of end entity certificates is compromised and adding, by the data processing hardware, the respective end entity certificate to the certificate revocation list.

Each intermediate certificate authority may be associated with a unique key derived from a common seed value. In some implementations, each unique key is derived using a key derivation function. Optionally, the respective validation time period of the respective intermediate certificate authority is shorter than the validation time periods of any intermediate certificate authorities higher in the chain of intermediate certificate authorities than the respective intermediate certificate authority. In some implementations, the method further includes determining, by the data processing hardware, that a respective end entity certificate of the plurality of end entity certificates has been rotated and adding, by the data processing hardware, the respective end entity certificate to the certificate revocation list.

Another aspect of the disclosure provides data processing hardware and memory hardware in communication with the data processing hardware. The memory hardware stores instructions that when executed on the data processing hardware cause the data processing hardware to perform operations. The operations include obtaining, from a root certificate authority, a root digital certificate digitally signed by the root certificate authority. The operations also include generating a chain of intermediate certificate authorities. Each respective intermediate certificate authority in the chain of intermediate certificate authorities includes a respective intermediate certificate digitally signed by the intermediate certificate authority or the root certificate authority that is immediately higher in the chain of intermediate certificate authorities than the respective intermediate certificate authority and a respective validation time period indicating a range of times when the respective intermediate certificate authority is permitted to digitally sign intermediate certificates and end entity certificates. The respective validation time period of the respective intermediate certificate authority includes the validation time period of each intermediate certificate authority that is lower in the chain of intermediate certificate authorities than the respective intermediate certificate authority. The operations also include generating a certificate revocation list for the chain of intermediate certificate authorities. The operations also include generating, from the lowest intermediate certificate authority in the chain of intermediate certificate authorities, a plurality of end entity certificates. Each end entity certificate of the plurality of end entity certificates is digitally signed by the lowest intermediate certificate authority in the chain of intermediate certificate authorities. The operations also include, after the respective validation time period of the lowest intermediate certificate authority in the chain of intermediate certificate authorities has elapsed, adding, to the certificate revocation list, one or more of the plurality of end entity certificates generated from the lowest intermediate certificate authority in the chain of intermediate certificate authorities.

This aspect may include one or more of the following optional features. In some implementations, when every end entity certificate digitally signed by a respective intermediate certificate authority in the chain of intermediate certificate authorities has been added to the certificate revocation list and the current time is at or after an end of the respective validation time period of the respective intermediate certificate authority, the operations include removing each of the plurality of leaf certificates from the certificate revocation list and adding the respective intermediate certificate associated with the respective intermediate certificate authority to the certificate revocation list. In some examples, the operations include, after the respective validation time period associated with a respective intermediate certificate authority in the chain of intermediate certificate authorities has elapsed, generating another intermediate certificate authority associated with a validation time period having a same duration as the validation time period associated with the respective intermediate certificate authority. The operations may also include replacing the respective intermediate certificate authority with the other intermediate certificate authority in the chain of intermediate certificate authorities. The operations may also include, after replacing the respective intermediate certificate authority with the other intermediate certificate authority, generating an end entity certificate digitally signed by the other intermediate certificate authority and not digitally signed by the respective intermediate certificate authority.

Optionally, each validation time period is associated with one of a day, a week, a month, a quarter, or a year. In some implementations, each end entity certificate does not have an expiration time, in some examples, the operations include determining that a respective end entity certificate of the plurality of end entity certificates is compromised and adding the respective end entity certificate to the certificate revocation list.

Each intermediate certificate authority may be associated with a unique key derived from a common seed value. In some implementations, each unique key is derived using a key derivation function. Optionally, the respective validation time period of the respective intermediate certificate authority is shorter than the validation time periods of any intermediate certificate authorities higher in the chain of intermediate certificate authorities than the respective intermediate certificate authority. In some implementations, the method further includes determining that a respective end entity certificate of the plurality of end entity certificates has been rotated and adding the respective end entity certificate to the certificate revocation list.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 6 is a table of parameters for a key derivation function.

FIG. 9 is a schematic view of an example computing device that may be used to implement the systems and methods described herein.

Like reference symbols in the various drawings indicate like elements.

DETAILED DESCRIPTION

Figure 1:
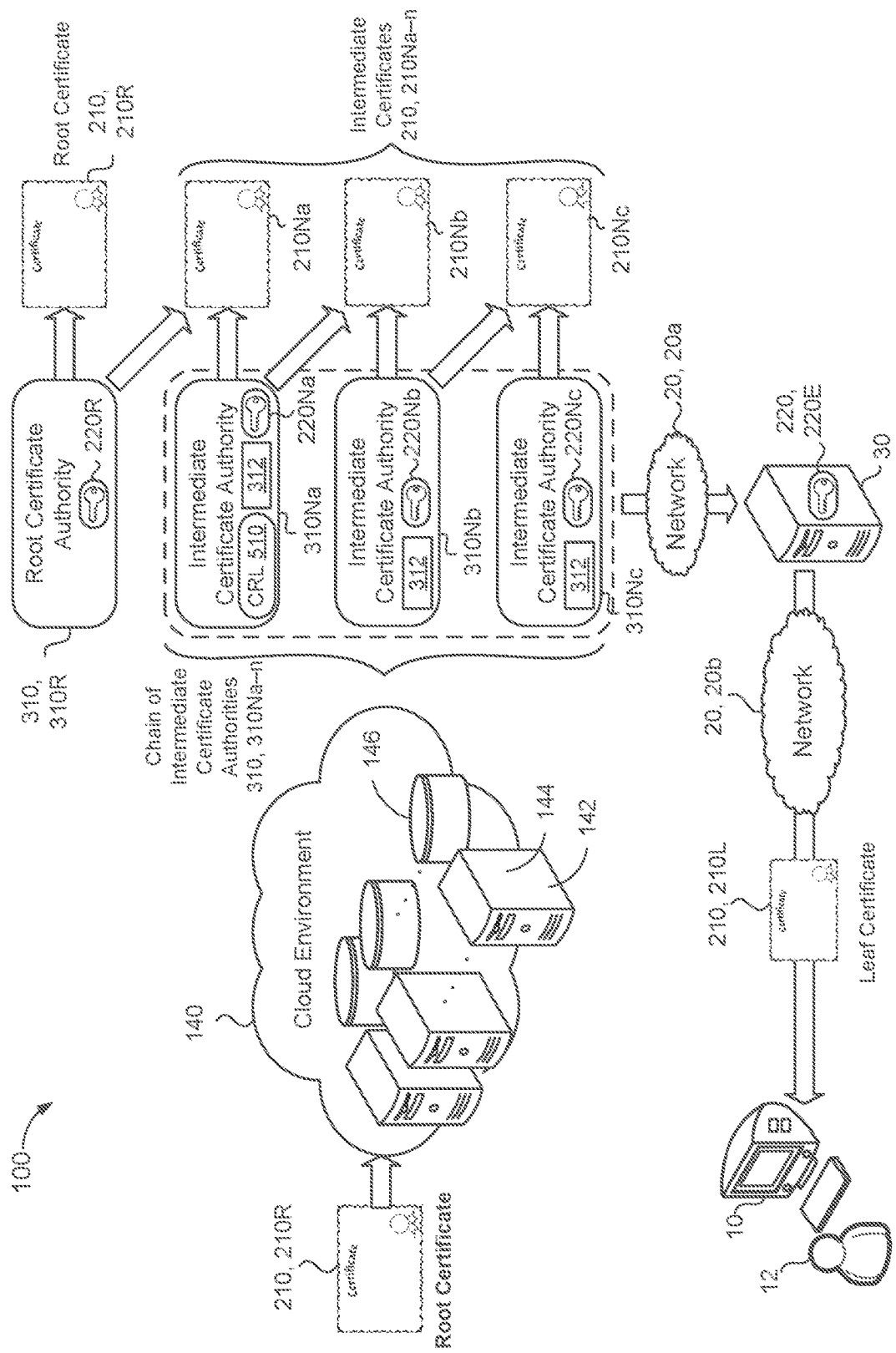
FIG. 1 is a schematic view of an example system for representing certificate expiration.

Digital certificates (also referred to as public key certificates or identity certificates) are commonly used to cryptographically link ownership of a public key with a particular entity. For example, when a user is attempting to establish secure communications with an entity (e.g., a website via Hypertext Transfer Protocol Secure (HTTPS)), the user will need to use that entity's public key to encrypt communications. In order to verify that tire public key used when encrypting communications actually belongs to the entity the user desires to communicate with, the user will receive the entity's digital certificate which demonstrates the entity's ownership of the public key. The digital certificate is typically signed by a certificate authority. As long as the user trusts the certificate authority, the user may trust that the entity owns the public key referenced by the digital certificate.

Certificate authorities (CAs) are entities that issue and sign digital certificates. Generally, CAs are established entities that have acquired sufficient enough reputation and trust that clients will accept that a digital certificate signed by the CA is legitimate. Typically, a digital certificate applicant generates a key pair (i.e., a private key and a public key) and a certificate signing request (CSR). The CSR includes the public key and other information to be included in the certificate (e.g., the entity's name or identifier, domain name information, contact information, etc.). The applicant sends the CSR to a trusted CA. The CA receives the CSR and independently verifies the information included within the CSR is correct. If the CA believes the information to be correct, the CA signs a digital certificate (with the CA's own private key) that includes the applicant's public key and the other identifying information. The CA then provides the signed digital certificate back to the applicant.

When a third party desires to securely communicate with the recipient of the certificate, the recipient can present the digital certificate to the third party. The third party may use the digital certificate to confirm the CA's signature via the CA's public key. The third party may also confirm that the applicant has possession of the private key associated with the public key listed in the digital certificate and that the digital certificate has not been modified since being signed. The third party can now trust that the public key provided by the digital certificate belongs to the entity that the third party wishes to communicate with.

Trusted CAs publish what is commonly referred to as a root certificate. This root certificate is a digital certificate that is self-signed by the CA with its own private key and publically provides the CA's public key. Using the root certificate, third parties can verify any certificate issued by the CA that is signed with the same private key as the root certificate. In order to limit exposure of root certificates, intermediate CA's may be assigned a certificate by a root CA and these intermediate CA's may in turn issue end entity certificates (also referred to as leaf certificates) to entities. That is, as explained in more detail below, a root CA and one or more intermediate CAs may form a "chain" of CAs with the last intermediate CA in the chain issuing end entity certificates to end entities. A party who desires to validate an end entity certificate will follow the chain up until the root CA is reached.

Digital certificates are typically enforced with an expiration time or period of validity. For example, a digital certificate may include a start point of its period of validity and an end point of its period of validity (i.e., its expiration point). After the period of validity has ended, the digital certificate is no longer valid and third parties should no longer accept the certificate as evidence of ownership of the respective public key. While effective, periods of validity by necessity require the receiving party (i.e., the party that received the digital certificate and desires to authenticate it) to have reliable access to the current time. However, some devices that may wish to validate a digital certificate may not have access to the current time (e.g., some network devices like switches or network controllers do not have clocks or do not have accurate clocks), making the period of validity unreliable in these circumstances, especially for certificates with short periods of validity (i.e., frequently rotated digital certificates).

Another way to invalidate digital certificates is by publishing a certificate revocation list (CRL). Typically, this list is used only to revoke digital certificates prior to their scheduled expiration date. For example, if a digital certificate is known to be compromised, the digital certificate may be added to a CRL even though the digital certificate's period of validity has not yet expired. When validating the digital certificate, a party, in addition to ensuring that the period of validity has not expired by referencing a current time, will also check that the certificate is not listed in the CRL published by the CA that issued the certificate. Thus, a CRL may be used to revoke certificates that, do not have an expiration (or an expiration that is very long) to allow devices without reliable access to the current time an effective way to determine the validity of digital certificates. However, such a CRL would grow without bound and eventually become too large to be effective.

Implementations herein are directed toward a digital certificate management system that provides efficient revocation of frequently rotated digital certificates (also referred to herein as just "certificates") without relying on expiration of the certificates or a clock of a client device. The system includes a chain of time-based intermediate certificate authorities (CAs) that are each associated with or include a respective validation time period. The chain of intermediate CAs and respective validation time periods encode an expiration time into the certificates issued by the chain of intermediate CAs. Based on the respective validation time periods, the digital certificates issued by the chain of intermediate CAs are added to a certificate revocation list (CRL). The system may add certificates to the CRL in due course as the certificates are rotated (i.e., replaced by a newer certificate) or when the certificate or a CA is compromised. Once the system adds every digital certificate issued by a respective intermediate CA to the CRL, the system may revoke the digital certificate issued to that intermediate CA and prune the CRL of all certificates issued by the respective intermediate CA, thus ensuring that all of the certificates remain revoked without excessing growth of the CRL.

Referring to FIG. 1, in some implementations, an example digital certificate management system 100 includes a remote system 140. The remote system 140 may be multiple computers or a distributed system (e.g., a cloud environment) having scalable/elastic resources 142 including computing resources 144 (e.g., data processing hardware) and/or storage resources 146 (e.g., memory hardware).

The remote system 140 is configured to obtain a root certificate 210, 210R (e.g., an X.509 certificate). For example, the remote system 140 receives the root certificate 210R from an independent root certificate authority 310, 310R. Alternatively, the remote system 140 includes the root certificate authority 310R and generates the root certificate 210R itself. The root CA 310R digitally signs the root certificate 210R with a public key 220R owned by the root CA 310R. That is, as is well-known in public-key cryptography, only the root CA 310R has possession of a private key (not shown) that is associated with the public key 220R. The remote system 140 generates a chain of intermediate CAs 310, 310Na-n. Each intermediate CA 310N in the chain includes or is associated with a respective intermediate certificate 210, 210Na-n digitally signed by the intermediate CA 310N that is immediately higher in the chain of intermediate CAs 310N than the corresponding intermediate CA 310N. The remote system 140 may use any appropriate signing algorithm to sign the certificates 210. The respective intermediate certificate 210N of the intermediate CA 310N that is highest in the chain is signed by the root CA 310R, thus establishing a chain of trust. The lowest intermediate CA in the chain (i.e., intermediate CA 310Nc in the given example) issues end entity certificates 210L (e.g., X.509 certificates) to an end-entity 30 via, for example, network 20, 20a. When a third party, such as user 12 via user device 10 wishes to communicate with the end-entity 30, the end-entity 30 provides the user device 10 with the end entity certificate 210L (e.g., via a network 20b). That is, the lowest intermediate CA 310N in the chain of intermediate CAs 310N generates one or more end entity certificates 210L. Each generated end entity certificate 210L is digitally signed by the lowest intermediate CA 310N in the chain of intermediate CAs 310N. In some examples, each end entity certificate 210L does not include an expiration. In other examples, each end entity certificate 210L includes a maximum or very long expiration time length/duration (e.g., one or more years).

Figure 2:
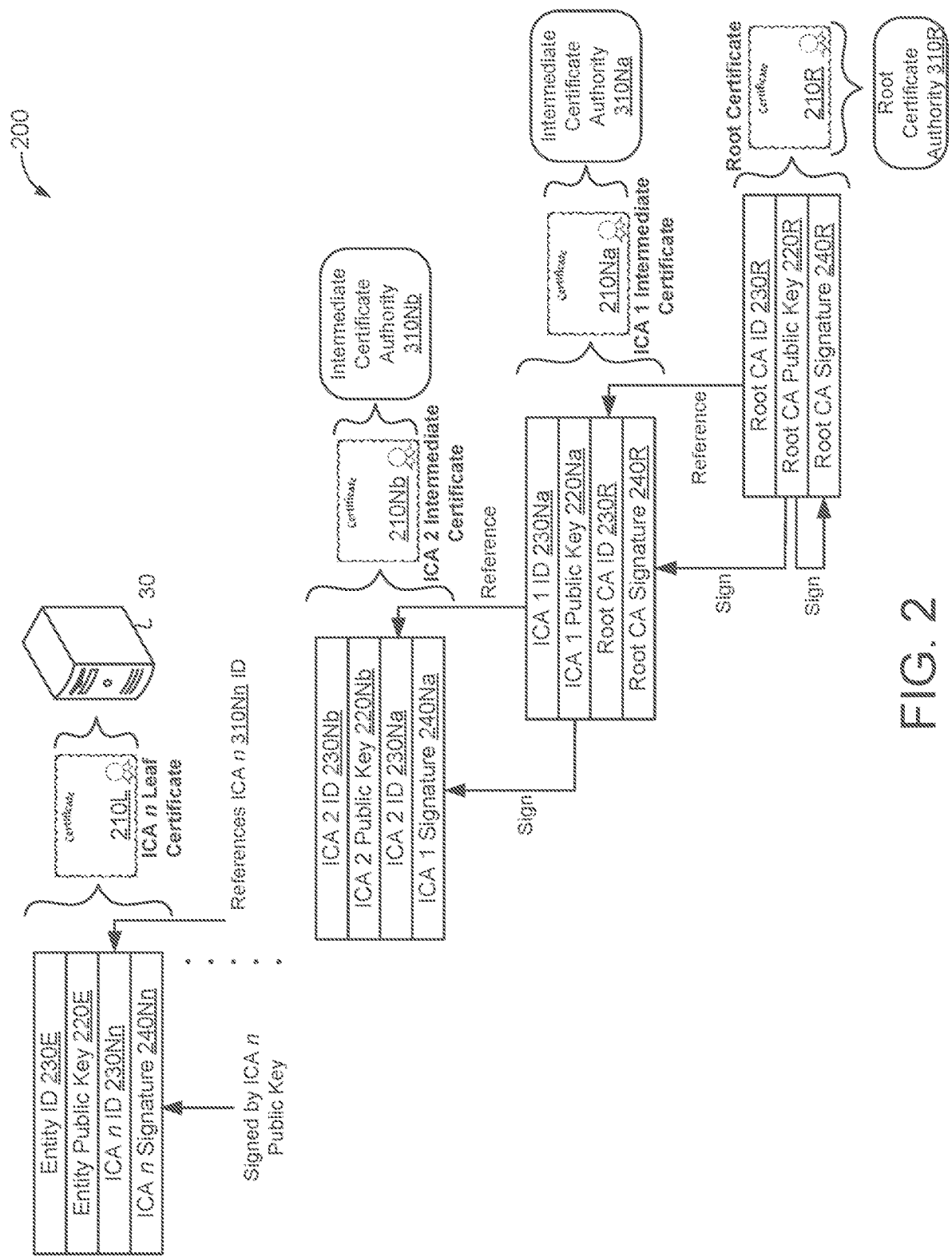
FIG. 2 is a schematic view of a chain of trust using intermediate certificate authorities.

Referring now to FIG. 2, the remote system establishes a chain of trust 200 between the intermediate certificates 310N by signing each certificate 210 in the chain with the public key 220N of the intermediate CA 310N immediately higher in the chain. Here, the root certificate 210R includes the public key 220R of the root CA, an identification (ID) 230R of the root CA, and a signature 240R of the root CA. The root CA signature 240R is signed by the private key (not shown) associated with the root CA public key 220R.

The root CA 310R maintains the root certificate 210R and issues an intermediate certificate 210Na to a first intermediate CA 310Na in the chain. This certificate includes the root CA ID 230R and the root CA signature 240R (signed by the same private key as the root CA signature 240R of the root certificate 210R). The intermediate certificate 210Na also includes an ID 230Na of the first intermediate CA 310N and the public key 220Na of the first intermediate CA 310Na. This certificate establishes the first intermediate CA's ownership of its public key 220Na.

Continuing up the chain, the first intermediate CA 310Na issues another intermediate certificate 210Nb to a second intermediate CA 310Nb. This intermediate certificate 210Nb includes the signature 240Na and the ID 230Na of the first intermediate CA 310Na. The intermediate certificate 210Nb also includes the ID 230Nb and the public key 220Nb second intermediate CA 310Nb. This chain continues for any length until a final intermediate CA 310Nn provides an end entity certificate 310L that includes its ID 230Nn and signature 240Nn to the entity 30. The end entity certificate also includes the ID 230E and the public key 220E of the entity 30. These linked certificates 210 provide a chain of trust that allows a third party to validate the entity's ownership of the public key 220E all the way back to the root authority 310R.

Referring back to FIG. 1, each intermediate CA 310N in the chain also includes a respective validation time period 312, 312 indicating a range of times when the corresponding intermediate CA 310N is permitted to digitally sign digital certificates 210N, 210L. That is, each intermediate CA 310N is time-based and the validation time period 312 for each intermediate CA 310N establishes the range of times when the corresponding intermediate CA 310N is permitted to issue certificates 210. For instance, the validation time period 312 for the last intermediate CA 310N (i.e., 310Nc in the given example) in the chain establishes the range of times when the corresponding intermediate CA 310N is permitted to issue end entity certificates 210L. In contrast to an expiration period assigned to a digital certificate 210 that requires a device to access a clock to determine when the expiration period has lapsed, the validation time period 312 is associated with the intermediate CA 310N, thereby indicating that no digital certificates 210N in the chain were digitally signed by the respective intermediate CA 310N after the validation time period 312.

Figure 3:
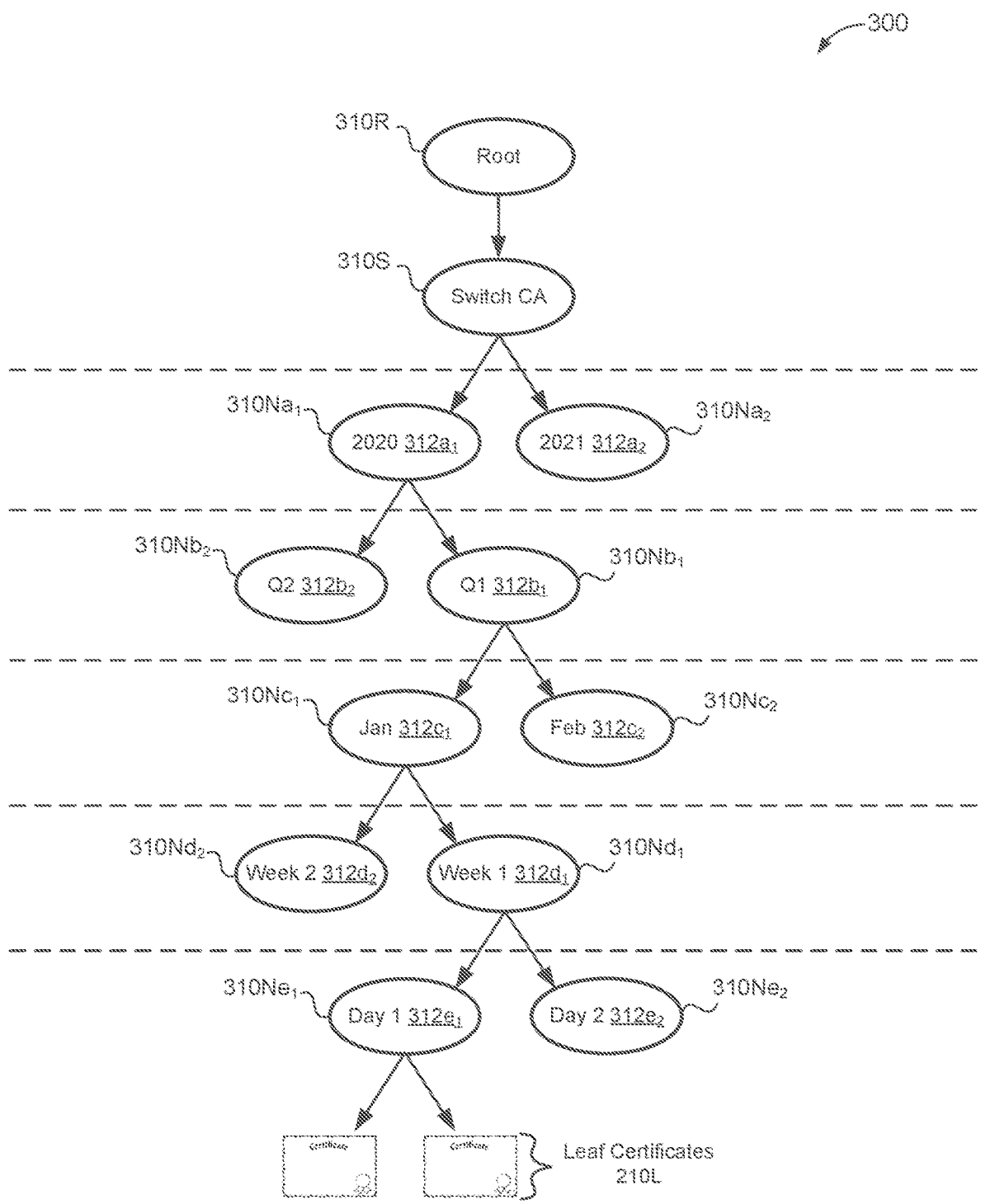
FIG. 3 is a schematic view of a chain of time-based intermediate certificate authorities.

Referring now to FIG. 3, a chain 300 of intermediate CAs 310N include exemplary validation time periods 312$a$-$e$. Here, the chain includes the root CA 310R at the top and next an optional switch CA 310S. The switch CA 310S may not have an associated validation time period and may instead delegate authority from the root CA 310R to the other intermediate CAs 310N. Below the switch CA 310S are two intermediate CAs 310Na$_1$, 310Na$_2$ with the validation time period 312$a_1$ of the year 2020 and the validation time period 312$a_2$ of the year 2021 respectively. Next in the chain are the two intermediate CAs 310$b_1$, 310$b_2$ with validation time periods 312$b_1$, 312$b_2$ of Q1 and Q2 respectively. Next in the chain are the two intermediate CAs 310$c_1$, 310$c_2$ with validation time periods 312$c_1$, 312$c_2$ of January and February respectively. Continuing down the chain are two intermediate CAs 310$d_1$, 310$d_2$ with validation time periods 312$d_1$, 312$d_2$ of Week 1 and Week 2 respectively. Finally, last in the chain are the two intermediate CAs 310$d_1$, 310$d_2$ with validation time periods 312$d_1$, 312$d_2$ of Day 1 and Day 2 respectively.

Each of these intermediate CAs 310 will only issue certificates 210N, 210L during the period of time within the validation time period 312 associated with the respective intermediate CA 310. For example, the intermediate CA 310Ne$_1$ may only issue certificates 210L for the 24 hours of Jan. 1, 2020. Once it becomes Jan. 2, 2020, the validation time period 312$e_1$ will conclude and the validation time period 312$e_2$ for the intermediate CA 310Ne$_2$ begins. Similarly, for the time period from Jan. 1, 2020 through Jan. 7, 2020, the intermediate CA 310Nd$_1$ ("Week 1") may issue certificates 210N while from Jan. 8, 2020 to Jan. 14, 2020, the intermediate CA 310Nd$_2$ ("Week 2") may issue certificates 210N. In some implementations, the respective validation time period 312 of each intermediate CA 310N is shorter than the validation time periods 312 of any intermediate CAs 310N higher in the chain of intermediate CAs 310N than the respective intermediate CA 310N. For example, the validation time period 312 for the "January" intermediate CA 310NC$_1$ (i.e., one month) is shorter than the validation time period 312 of both of the intermediate CAs 310N higher in the chain (i.e., the Q1 intermediate CA 310Nb$_1$ and the 2020 intermediate CA 310Na$_1$) That is, as the chain of intermediate CAs 310N is descended, the validation time period 312 grows shorter.

Figure 4A:
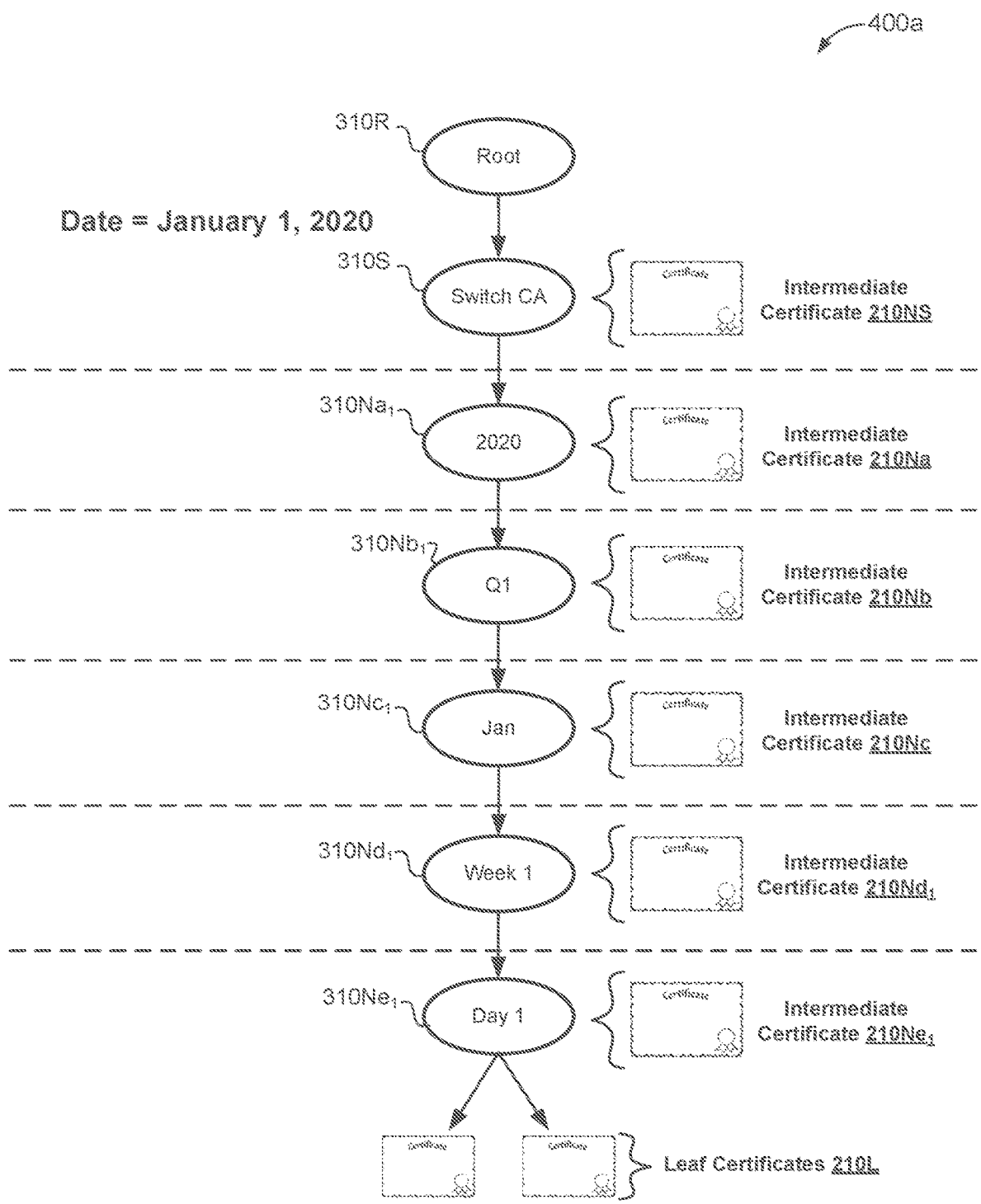
FIGS. 4A-4C are schematic views of exemplary chains of time-based intermediate certificate authorities.
Figure 4B:
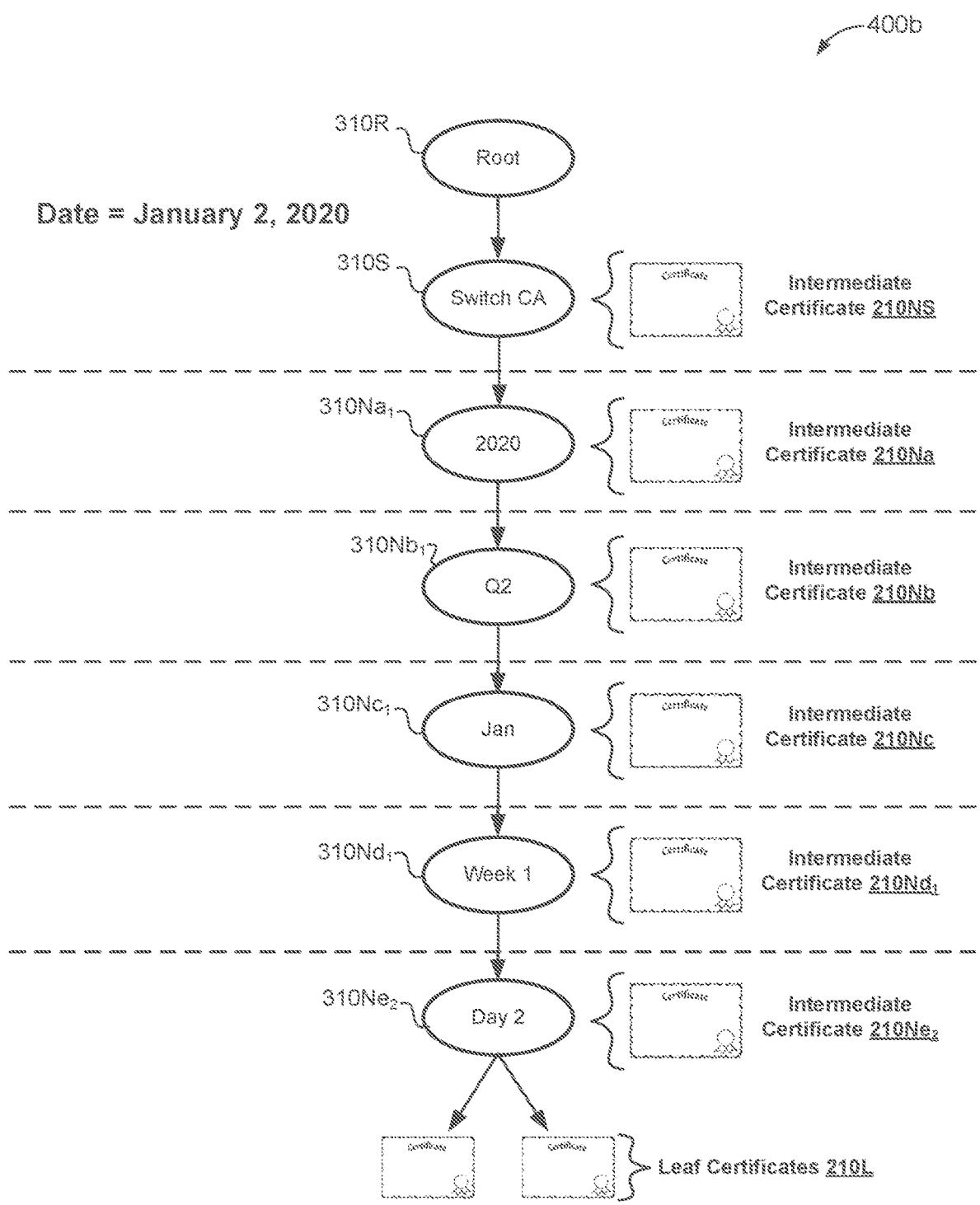
Figure 4C:
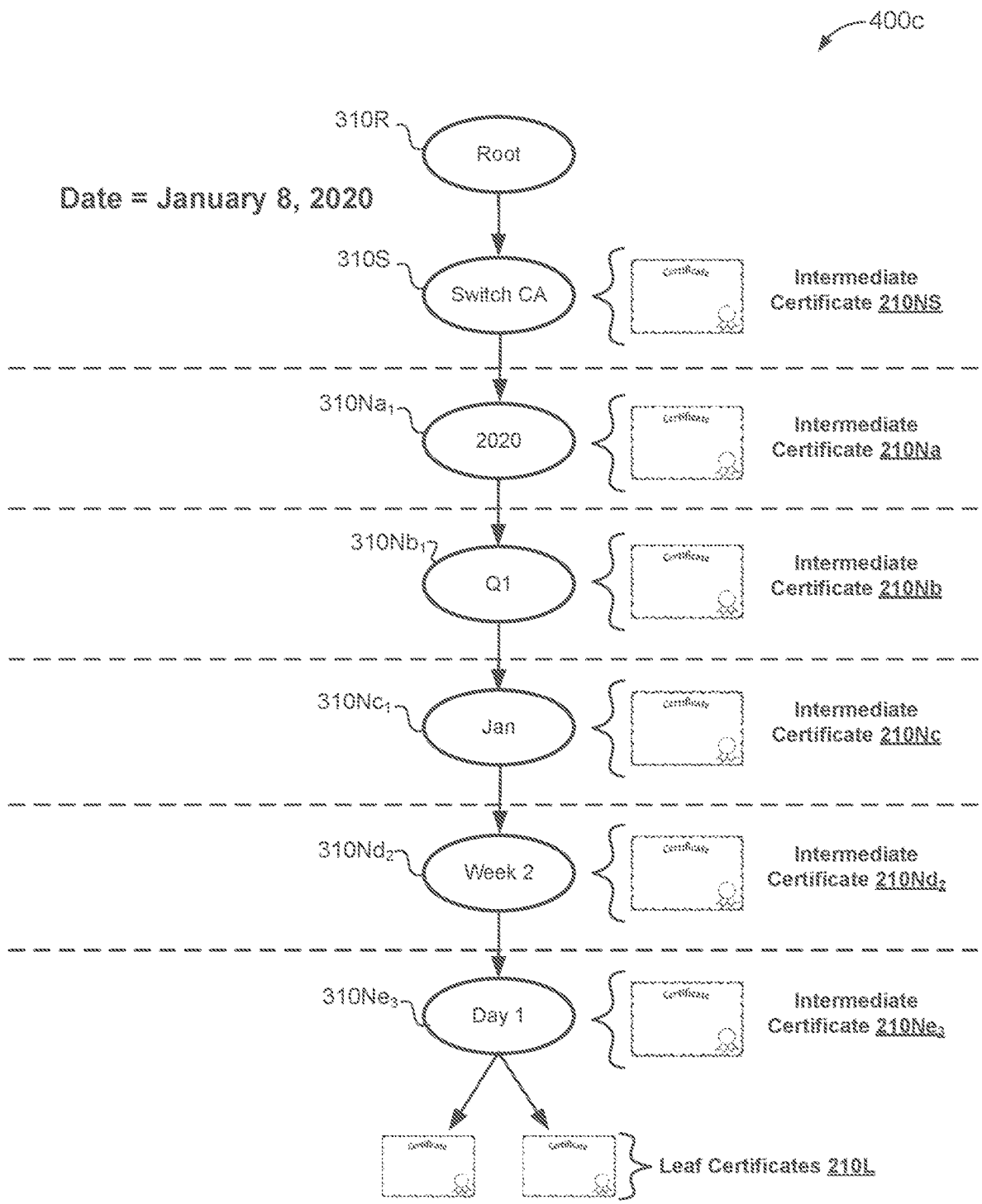

Referring now to FIGS. 4A-4C, in some examples, only a single chain of intermediate CAs 310N is active at any point in time. The chain 400$a$ of FIG. 4A illustrates an active chain on the date of Jan. 1, 2020. Only an active intermediate CA 310N may issue certificates 210. Here, the root CA 310R provides a certificate 210NS to the switch CA 310S, which provides a certificate 201Na to the intermediate CA 310Na$_1$, which provides a certificate 210Nb to the intermediate CA 310Nb$_1$, which in turn provides a certificate 210Nc to the intermediate CA 310Nc$_1$. Similarly, the intermediate CA 310Nc$_1$ provides a certificate 210Nd$_1$ to the intermediate CA 310Nd$_1$ which in turn provides a certificate 210Ne$_1$ to the intermediate CA 310Ne$_1$.

Because in this example the intermediate CA 310Ne$_1$ (i.e., Day 1) is the "bottom" of the chain, this intermediate CA 310Ne$_1$ provides end entity certificates 210L to requesting entities 30. However, any number of intermediate CAs 310N at any granularity of validation time periods 312 may be included. Here, the validation time periods 312 include a year, a quarter, a month, a week, and a day. Additionally or alternatively, any other time periods may be used such as an hour or a decade or other finite periods of time (e.g., 10 hours, 100 hours, 1000 hours, etc.) that do align with calendar dates.

Continuing the example of FIG. 4A, FIG. 4B illustrates the active chain 400$b$ at a date of Jan. 2, 2020 (i.e., one day after the date of FIG. 4A). In some implementations, after the respective validation time period 312 associated with a respective intermediate CA 310N in the chain of intermediate CAs 310N has elapsed, the remote system generates another intermediate CA 310N associated with a validation time period 312 having a same duration as the validation time period 312 associated with the respective intermediate CA 310N. However, the new validation time period 312 encompasses a period of time after the original validation time period 312 has elapsed. The remote system 140 replaces the respective intermediate CA 310B with the other intermediate CA 310N in the chain of intermediate CAs 310N.

In this case, because the validation time period 312 associated with the intermediate CA 310Ne$_1$ has elapsed (i.e., "Day 1" or Jan. 1, 2020), the active chain has replaced the Day 1 intermediate CA 310Ne$_1$ with the Day 2 intermediate CA 310Ne$_2$. The Week 1 intermediate CA 310Nd$_1$ issues the Day 2 intermediate CA 310Ne$_2$ an intermediate certificate 210Ne$_2$ and during this validation time period 312 (i.e., during Jan. 2, 2020), the Day 2 intermediate CA 310Ne2 issues end entity certificates 210L in lieu of the Day 1 intermediate CA 310Ne$_1$. In other words, in some implementations, after replacing the respective intermediate CA 310N (e.g., the Day 1 intermediate CA 310Ne$_1$) with the other intermediate CA 310N (e.g., the Day 2 intermediate CA 310Ne$_2$), the remote system 140 generates an end entity certificate 210L digitally signed by the other intermediate CA 310N and not digitally signed by the respective intermediate CA 310N. That is, the Day 2 intermediate CA 310Ne$_2$ begins issuing end entity certificates 210L while the Day 1 intermediate CA 310Ne$_1$ no longer issues end entity certificates 210L.

In yet another example, FIG. 4C illustrates the active chain 400c at a date of Jan. 8, 2020 (i.e., 7 days after the date of FIG. 4A). Now, the validation time period 312 associated with Week 1 intermediate CA 310Nd$_1$ has elapsed and the January intermediate certificate authority 310Nc$_1$ has issued a new intermediate certificate 210Nd$_2$ to the Week 2 intermediate CA 310Nd$_2$. Likewise, the Week 2 intermediate CA 310Nd$_2$ issues a new certificate 210Ne$_3$ to a new Day 1 intermediate CA 310Ne$_3$. The Week 2 intermediate CA 310Nd$_2$ will issue certificates 210N during the time period of Jan. 8, 2020 to Jan. 14, 2020 while the Day 1 intermediate CA 310Ne$_3$ will issue end entity certificates 210L for the day of Jan. 8, 2020.

Referring back to FIG. 1, the remote system 140 generates a certificate revocation list (CRL) 510. While in the given example, the system 100 provides a single aggregate CRL 510 at the top level of the chain of intermediate CAs 310N (i.e., intermediate CA 310Na in FIG. 1), alternatively each intermediate CA 310N may include its own respective CRL 510. The CRL 510 contains a list of each certificate 210N, 210L that the system 100 has issued and subsequently revoked.

Figure 5A:
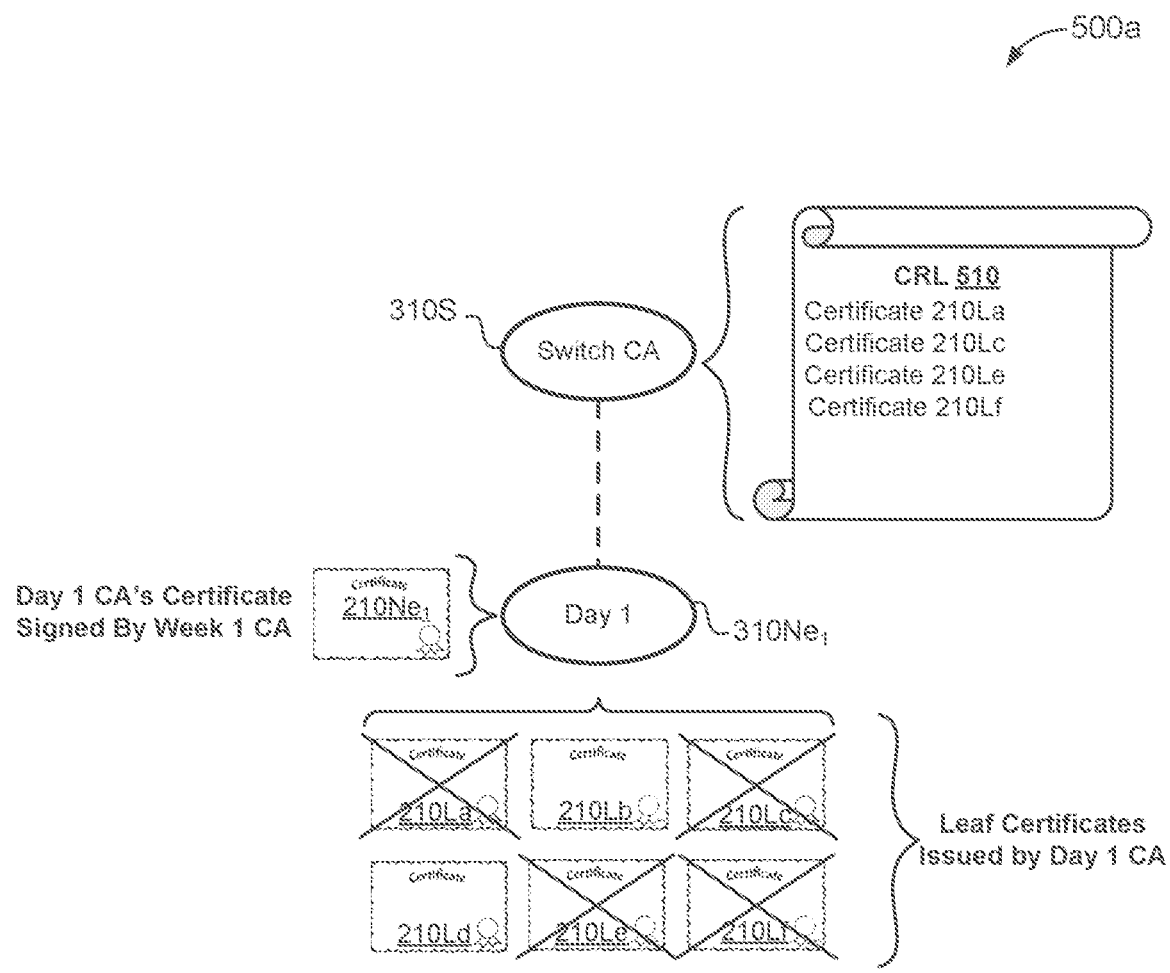
FIGS. 5A-5C are schematic views of certificates added and removed from a certificate revocation list.
Figure 5B:
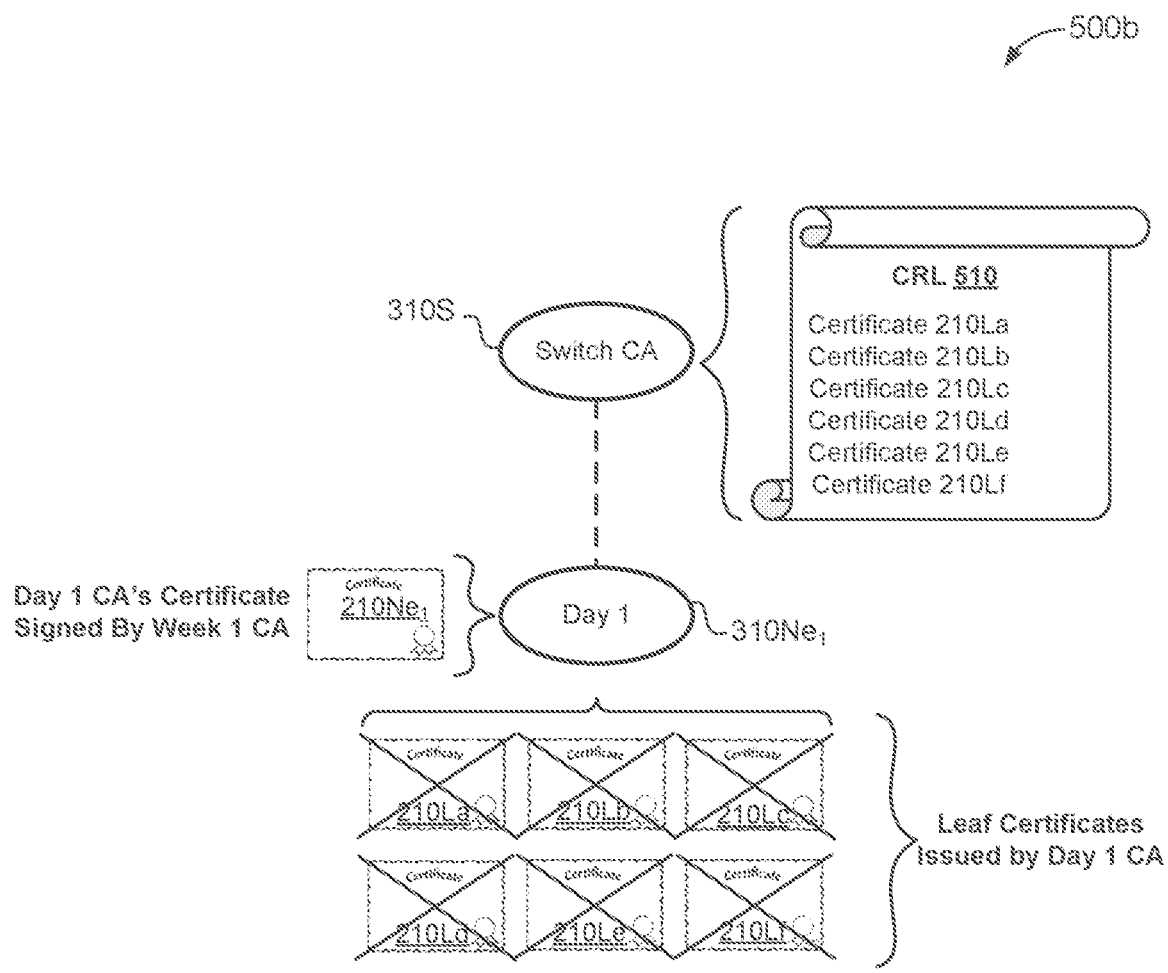
Figure 5C:
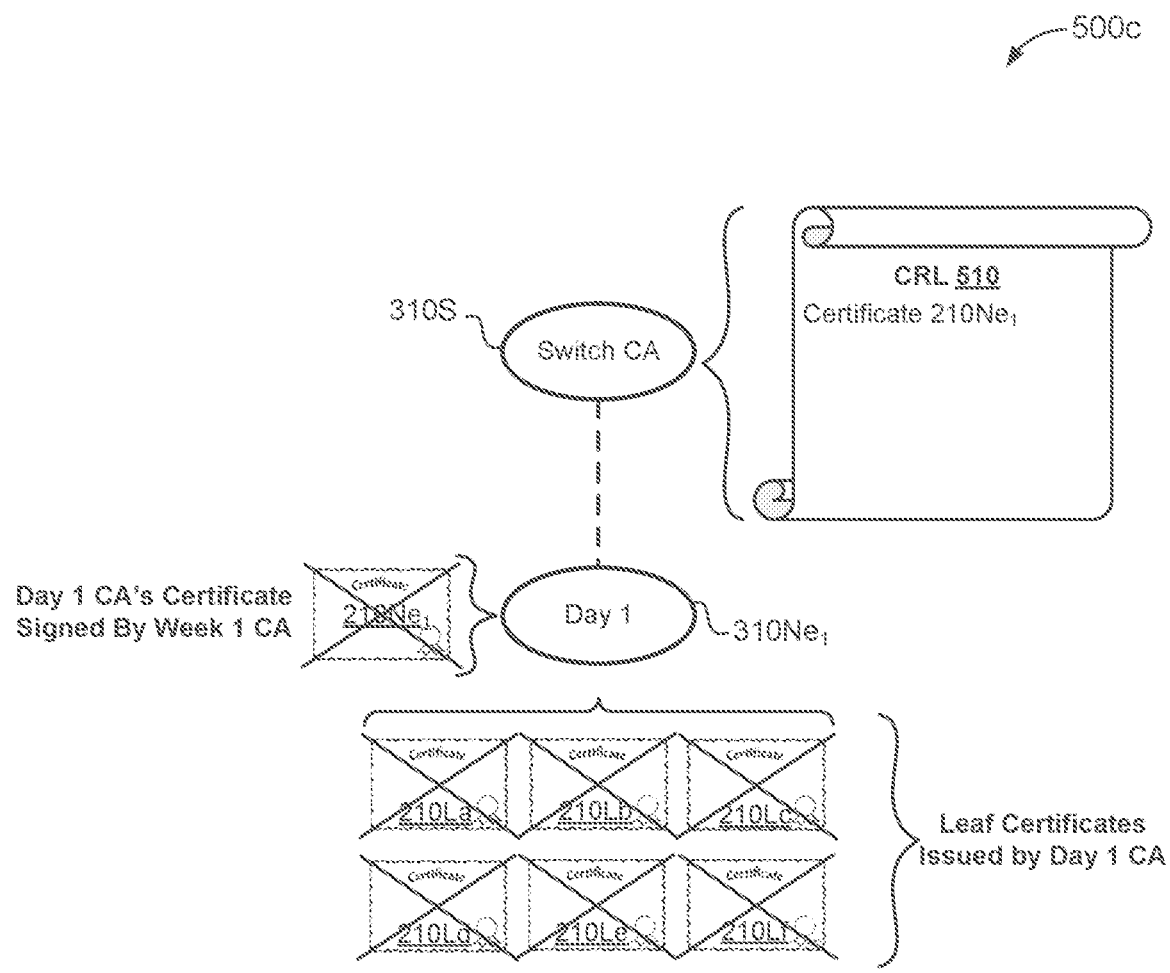

Referring now to FIGS. 5A-5C, after the respective validation time period 312 of the lowest intermediate CA 310N in the chain of intermediate CAs 310N has passed, the remote system 140 may add, to the CRL 510, one or more of the end entity certificates 210L generated from the lowest intermediate CA 310N in the chain of intermediate CAs 310N. That is, generally, certificates 210N, 210L may be added to the CRL 510 at any point after the validation time period 312 associated with the intermediate CA 310 that issued the certificate has passed or elapsed. Thus, the remote system 140 efficiently revokes the digital certificates 210 without relying on an expiration time recorded within the certificates themselves or on clocks of client devices.

Notably, there is no specific point in which certificates 210N, 210L must be added to the CRL 510, and in fact the timing may vary significantly. In some examples, the remote system 140 adds the certificate 210 to the CRL 510 prior to the respective validation time period 312 elapsing. For instance, if the certificate 210 or the issuing CA 310 has been compromised (e.g., the private key exposed), the remote system 140 may revoke the certificate 210 early (i.e., before the period of validity 312 elapses). Here, the remote system 140 determines that a respective end entity certificate 210L is compromised and adds the respective end entity certificate 210L to the CRL 510 immediately.

On the other hand, the remote system 140 may wait any amount of time after the validation time period 312 has passed prior to adding the certificate 210 to the CRL 510. For example, the remote system 140 waits until a replacement certificate 210 (i.e., a certificate 210 with a later issue date) is in place (i.e., the certificate 210 has been successfully rotated) prior to revoking the original certificate 210 to ensure there is no lapse in service. Thus, even after the validation time period 312 associated with a respective intermediate CA 210 has passed, it may be some time before each certificate 210 issued by that respective intermediate CA 310 to be revoked.

In the example view 500a of FIG. 5A, the Day 1 intermediate CA 310Ne$_1$ issued six end entity certificates 210L during its validation time period 312. At this point, the validation time period 312 for the Day 1 intermediate CA 310Ne$_1$ has elapsed and the remote system 140 has added four of the six end entity certificates 210L to the CRL 510 (i.e., end entity certificates 210La, 210Lc, 210Le, 210Lf). However, two end entity certificates 210Lb, 210Ld issued by the Day 1 intermediate CA 310Ne$_1$ remain unrevoked. Referring now to the example view 500b in FIG. 5B, at this point in time, the remote system 140 has added all six certificates 210 issued by the Day 1 intermediate CA 310Ne$_1$ to the CRL 510. Thus, the CRL 510 includes a total of six entries based on the certificates 210 issued by the Day 1 intermediate CA 310Ne$_1$.

In the example view 500c of FIG. 5C, the remote system 140, in some implementations, prunes the CRL 510 by removing each of the end entity certificates 210L from the CRL 510 issued by the Day 1 intermediate CA 310Ne$_1$ and adding the respective intermediate certificate 210Ne$_1$ associated with the Day 1 intermediate CA 310Ne$_1$ to the CRL 510. That is, when every end entity certificate 210L digitally signed by a respective intermediate CA 310N in the chain of intermediate CAs 210 has been added to the CRL 510 and the current time is at or after an end of the respective validation time period 312 of the respective intermediate CA 310N (i.e., the respective intermediate CA 310N cannot issue any new certificates 210), the remote system 140 may replace all of the entries in the CRL 510 of certificates 210 issued by the respective intermediate CA 310 with just the certificate 210N of the respective intermediate CA 310. Put another way, once the remote system 140 adds an intermediate CA 310N to the CRL 510, every certificate 210 lower in the hierarchy may be pruned from the CRL 510. As this process works its way up the chain of intermediate CAs 310, this greatly reduces the size of the CRL 510. In the example shown, after the year 2020 is over, instead of listing the thousands or millions of certificates 210 potentially issued during the entire year, the CRL 510 can instead be collapsed or compressed to just a single entry of the certificate issued to the 2020 intermediate CA 310Na$_1$. It must be noted that adding a certificate 210 issued to a CA 310 breaks the chain of trust and thus all certificates 210 issued by that CA are immediately revoked. Therefore, generally the CA's certificate 210 is not added to the CRL 510 until all certificates 210 issued by the respective CA 310 have already been revoked unless there is cause to do otherwise (i.e. if the CA 310 has been compromised, it may be desirable to revoke all of its certificates 210 regardless of the state of the validation time period 312).

Referring now to FIG. 6, the digital certificate management system 100 generates a unique key 220N (e.g., a public key and a private key) for each generated intermediate certificate authority 310N. In the example where the validation time period 312 for the lowest intermediate CA 310N is a day and the validation time period 312 for the highest CA 310N in the chain is one year (FIG. 3), the digital certificate management system 100 must generate, store, and distribute 434 keys per year (i.e., 365 days+52 weeks+12 months+4 quarters+1 year) with each key being provided to the respective intermediate CA 310N prior to that respective intermediate CA 310N issuing any certificates 210.

Figure 7:
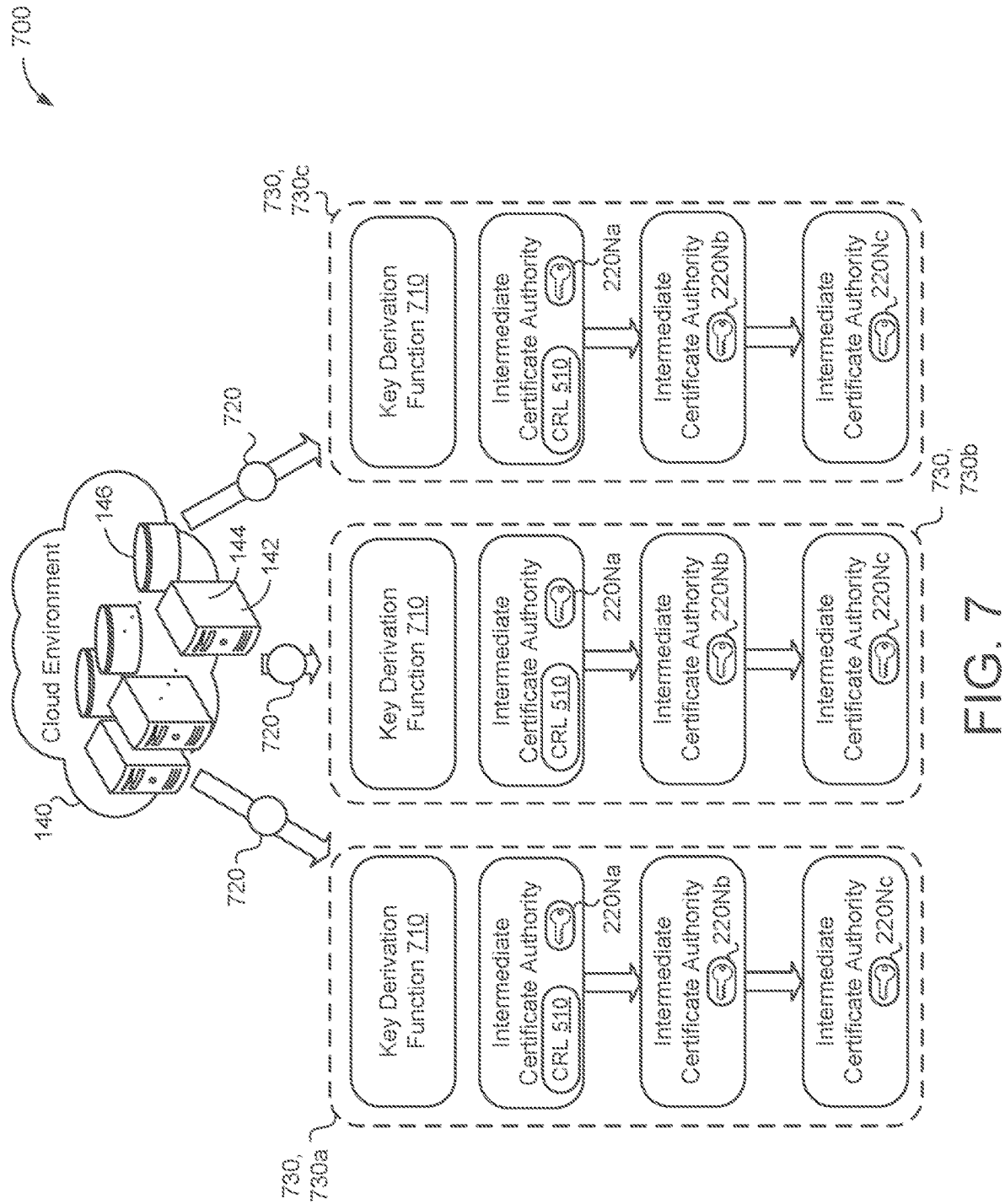
FIG. 7 is a schematic view of multiple instances of chains of time-based intermediate certificate authorities.

To reduce key management overhead, in some implementations, each intermediate CA 310N is associated with a unique key 220N derived form a common seed value. In some examples, each unique key 220N is derived using a key derivation function (KDF) 710 (FIG. 7). A KDF is a cryptographic function that derives one or more secret keys from a single secret value such as a master key 720 (FIG. 1). For example, the KDF 710 is based on a one-step key derivation that accepts as input a secret byte string (i.e., the master key 720) and a key-specific byte string.

Optionally, the key-specific byte string is encoded deterministically. In some examples, the key-specific byte string for a respective intermediate CA 310N includes an encoded path down the chain to the respective intermediate CA 310N and a number of steps (e.g., bits) in the path. The key-specific byte string may include other information such as key purpose and other context. Table 600 provides exemplary key-specific byte string information for a chain of intermediate CAs 310N. The table 600 includes a label 610 column, a path 620 column, and an encoded path 630 column. The label 610 indicates an identifier for the respective intermediate CA 310N (e.g., Switch, 2020, Q1, January, Week 1, Day 1, etc.). The path 620 indicates each intermediate CA 310N in the chain of intermediate CAs 310N from the top of the chain to the respective intermediate CA 310N. For example, the "January" intermediate CA 310N has a path that includes 2020, Q1, and January. Similarly, the "Day 1" intermediate CA 310N has a path that includes 2020, Q1, January, Week 1, and Day 1.

The encoded path 630 includes a path length 632 of the path 620 that is dependent upon the number of intermediate CAs 310N in the path 620. The encoded path 630 also includes a path encoding 634 of the path 620. For example, the encoded path 630 of the intermediate CA 310N "Q1" has a path length 632 of [2] (because the corresponding path 620 includes 2020 and Q1) and a path encoding 634 of [2020] (for the year) and [1] (for the first quarter) Similarly, Week 1 has the encoded path 630 with a path length 632 of [4] (2020, Q1, Jan, Week 1) and a path encoding 634 of [2020] [1] [1] [1] (for the year 2020, the first quarter, the first month, and the first week). In another example (not shown), an encoded path 630 intermediate CA 310N with a validation time period 312 that encompasses Apr. 9, 2021 includes a path length 632 of [5] and a path encoding 634 of [2021] [2] [1] [2] [2] for the year of 2021, the second quarter of 2021, the first month of the second quarter, the second week of the month, and the second day of the week.

Each encoded portion (i.e., each portion in brackets) may be encoded as one or more bytes (e.g., as a big-endian integer). The remote system 140 provides the KDF 710 with the encoded path 630 and a secret key to generate a unique key for each intermediate CA 310N. Other means of deterministically deriving keys are also contemplated. For example, the remote system 140 uses a key hierarchy model to generate key bits and partition the key bits into a key derivation key for each intermediate CA 310N. The key derivation function may support any sort of signing algorithms (such as elliptic-curve, RSA, etc.). Each key 220N the remote system 140 generates may be completely deterministic given the same secret key. That is, the remote system 140, provided with the same secret key, may generate the same keys 220N for each intermediate CA 130N.

Referring now to FIG. 7, in some implementations, the remote system 140 executes multiple instances 730, 730a-n of the chain of intermediate CAs 310N. Multiple instances may provide additional redundancy (in case of failure), increased load capability, and other benefits. However, each instance must generate the same keys for each intermediate CA 310N so that a user device 10 or other entity verifying an issued certificates 210 may use any available instance 730. Because, in some examples, the KDF 710 generates the keys 220N deterministically, distribution and synchronization of the keys 220N is greatly simplified. Mere, the remote system shares the secret key 720 to the KDF 710 of each instance 730. Because each instance uses the same KDF 710 with the same secret key 720, the generated keys 220 that are distributed to each intermediate CA 310N are the same. Thus, the remote system only shares and synchronizes a single secret (the master key 720) to synchronize each instance 730.

Figure 8:
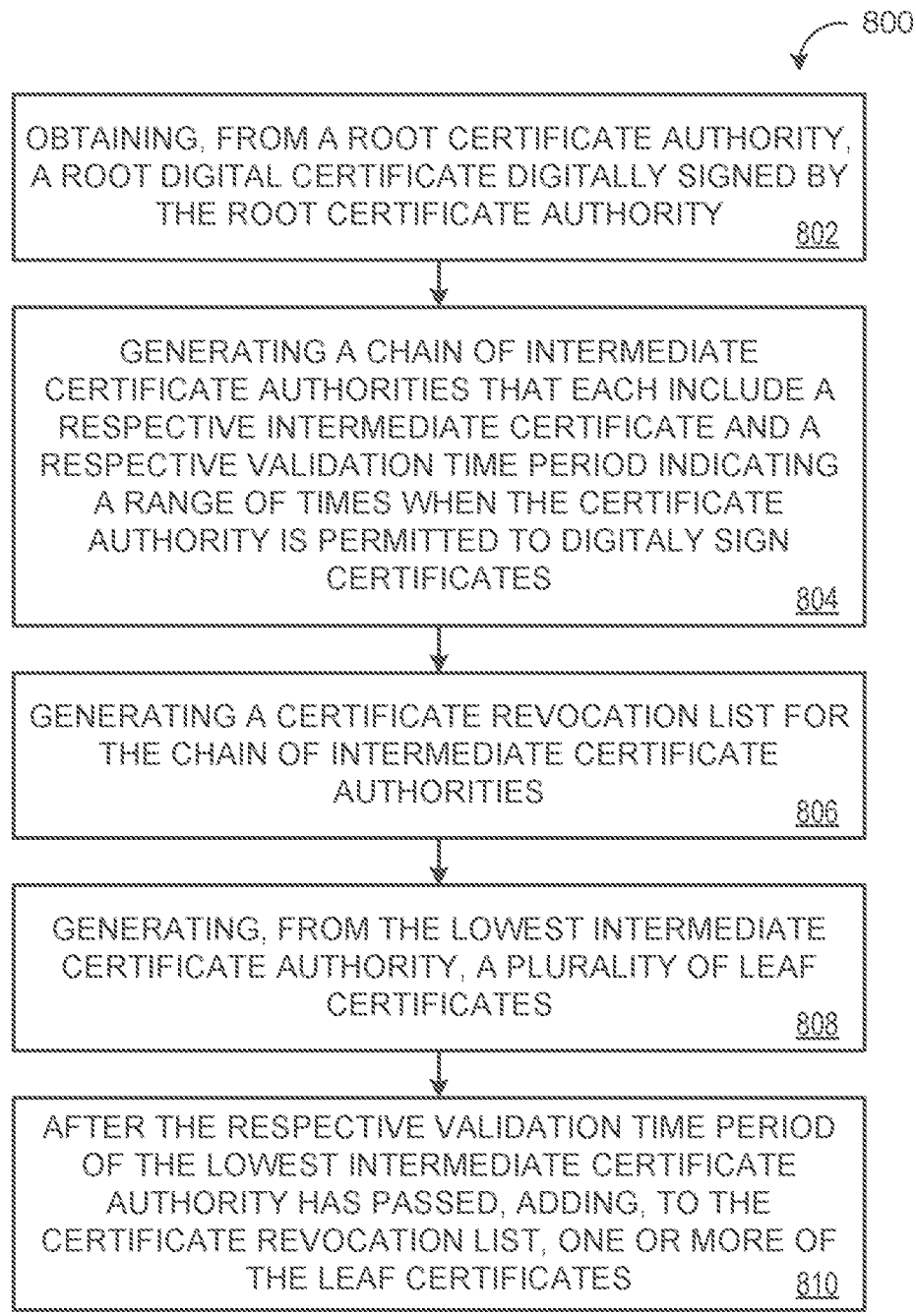
FIG. 8 is a flowchart of an example arrangement of operations for a method of representing certificate expiration.

FIG. 8 is a flowchart of an exemplary arrangement of operations for a method 800 for representing certificate expiration with time-based intermediate certificate authorities. The method 800, at operation 802, includes obtaining, at data processing hardware 144, from a root certificate authority 310R, a root digital certificate 210R digitally signed by the root certificate authority 310R. At operation 804, the method 800 includes generating, by the data processing hardware 144, a chain of intermediate certificate authorities 310N. Each respective intermediate certificate authority 310N in the chain of intermediate certificate authorities 310N includes a respective intermediate certificate 210N digitally signed by the intermediate certificate authority 310N or the root certificate authority 310R that is immediately higher in the chain of intermediate certificate authorities 310N than the respective intermediate certificate authority 310N. Each respective intermediate certificate authority 310N also includes a respective validation time period 312 indicating a range of times when the respective intermediate certificate authority 310N is permitted to digitally sign intermediate certificates 210N and end entity certificates 210L. The respective validation time period 312 of the respective intermediate certificate authority 310N includes the validation time period 312 of each intermediate certificate authority 310N that is lower in the chain of intermediate certificate authorities 310N than the respective intermediate certificate authority 310N.

The method 800, at operation 806, includes generating, by the data processing hardware 144, a certificate revocation list 510 for the chain of intermediate certificate authorities 310N. At operation 808, the method 800 includes generating, by the data processing hardware 144, from the lowest intermediate certificate authority 310N in the chain of intermediate certificate authorities 310N, a plurality of end entity certificates 210L. Each end entity certificate 210L of the plurality of end entity certificates 210L is digitally signed by the lowest intermediate certificate authority 310N in the chain of intermediate certificate authorities 310N. After the respective validation time period 312 of the lowest intermediate certificate authority 310N in the chain of intermediate certificate authorities 310N has elapsed, the method 800, at operation 810, includes adding, by the data processing hardware 144, to the certificate revocation list 510, one or more of the plurality of end entity certificates 210L generated from the lowest intermediate certificate authority 310N in the chain of intermediate certificate authorities 310N.

FIG. 9 is schematic view of an example computing device 900 that may be used to implement the systems and methods described in this document. The computing device 900 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 900 includes a processor 910, memory 920, a storage device 930, a high-speed interface/controller 940 connecting to the memory 920 and high-speed expansion pons 950, and a low speed interface/controller 960 connecting to a low speed bus 970 and a storage device 930. Each of the components 910, 920, 930, 940, 950, and 960, are interconnected using various busses, and may be mounted on a common motherboard or in other manners as appropriate. The processor 910 can process instructions for execution within the computing device 900, including instructions stored in the memory 920 or on the storage device 930 to display graphical information for a graphical user interface (GUI) on an external input/output device, such as display 980 coupled to high speed interface 940. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 920 stores information non-transitorily within the computing device 900. The memory 920 may be a computer-readable medium, a volatile memory unit(s), or non-volatile memory unit(s). The non-transitory memory 920 may be physical devices used to store programs (e.g., sequences of instructions) or data (e.g., program state information) on a temporary or permanent basis for use by the computing device 900. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 930 is capable of providing mass storage for the computing device 900. In some implementations, the storage device 930 is a computer-readable medium. In various different implementations, the storage device 930 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 920, the storage device 930, or memory on processor 910.

The high speed controller 940 manages band width-intensive operations for the computing device 900, while the low speed controller 960 manages lower bandwidth-intensive operations. Such allocation of duties is exemplary only. In some implementations, the high-speed controller 940 is coupled to the memory 920, the display 980 (e.g., through a graphics processor or accelerator), and to the high-speed expansion ports 950, which may accept various expansion cards (not shown). In some implementations, the low-speed controller 960 is coupled to the storage device 930 and a low-speed expansion port 990. The low-speed expansion port 990, which may include various communication pons (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 900a or multiple times in a group of such servers 900a, as a laptop computer 900b, or as part of a rack server system 900c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to a storage system, at least one input device, and at least one output device.

A software application (i.e. a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing, computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   obtaining, at data processing hardware, from a root certificate authority, a root digital certificate digitally signed by the root certificate authority;
   generating, by the data processing hardware, a chain of intermediate certificate authorities, each respective intermediate certificate authority in the chain of intermediate certificate authorities comprising:
      a respective intermediate certificate digitally signed by the intermediate certificate authority or the root certificate authority that is immediately higher in the chain of intermediate certificate authorities than the respective intermediate certificate authority; and
      a respective validation time period indicating a range of times when the respective intermediate certificate authority is permitted to digitally sign intermediate certificates and end entity certificates, the respective validation time period of the respective intermediate certificate authority including the validation time period of each intermediate certificate authority that is lower in the chain of intermediate certificate authorities than the respective intermediate certificate authority;
   generating, by the data processing hardware, a certificate revocation list for the chain of intermediate certificate authorities;
   generating, by the data processing hardware, from the lowest intermediate certificate authority in the chain of intermediate certificate authorities, a plurality of end entity certificates, each end entity certificate of the plurality of end entity certificates digitally signed by the lowest intermediate certificate authority in the chain of intermediate certificate authorities; and
   after the respective validation time period of the lowest intermediate certificate authority in the chain of intermediate certificate authorities has elapsed, adding, by the data processing hardware, to the certificate revocation list, one or more of the plurality of end entity certificates generated from the lowest intermediate certificate authority in the chain of intermediate certificate authorities.

2. The method of claim 1, further comprising, when every end entity certificate digitally signed by a respective intermediate certificate authority in the chain of intermediate certificate authorities has been added to the certificate revocation list and the current time is at or after an end of the respective validation time period of the respective intermediate certificate authority:
   removing, by the data processing hardware, each of the plurality of end entity certificates front the certificate revocation list; and
   adding, by the data processing hardware, the respective intermediate certificate associated with the respective intermediate certificate authority to the certificate revocation list.

3. The method of claim 1, further comprising, after the respective validation time period associated with a respective intermediate certificate authority in the chain of intermediate certificate authorities has elapsed:
   generating, by the data processing hardware, another intermediate certificate authority associated with a validation time period having a same duration as the validation time period associated with the respective intermediate certificate authority; and
   replacing, by the data processing hardware, the respective intermediate certificate authority with the other intermediate certificate authority in the chain of intermediate certificate authorities.

4. The method of claim 3, further comprising, after replacing the respective intermediate certificate authority with the other intermediate certificate authority, generating, by the data processing hardware, an end entity certificate digitally signed by the other intermediate certificate authority and not digitally signed by the respective intermediate certificate authority.

5. The method of claim 1, wherein each validation time period is associated with one of a day, a week, a month, a quarter, or a year.

6. The method of claim 1, wherein each end entity certificate does not have an expiration time.

7. The method of claim 1, further comprising:
   determining, by the data processing hardware, that a respective end entity certificate of the plurality of end entity certificates is compromised; and
   adding, by the data processing hardware, the respective end entity certificate to the certificate revocation list.

8. The method of claim 1, wherein each intermediate certificate authority is associated with a unique key derived from a common seed value.

9. The method of claim 8, wherein each unique key is derived using a Key Derivation Function.

10. The method of claim 1, wherein the respective validation time period of the respective intermediate certificate authority is shorter than the validation time periods of any intermediate certificate authorities higher in the chain of intermediate certificate authorities than the respective intermediate certificate authority.

11. The method of claim 1, further comprising:
    determining, by the data processing hardware, that a respective end entity certificate of the plurality of end entity certificates has been rotated; and
    adding, by the data processing hardware, the respective end entity certificate to the certificate revocation list.

12. A system comprising:
    data processing hardware; and
    memory hardware in communication with the data processing hardware, the memory hardware storing instructions that when executed on the data processing hardware cause the data processing hardware to perform operations comprising:
    obtaining, from a root certificate authority, a root digital certificate digitally signed by the root certificate authority;
    generating a chain of intermediate certificate authorities, each respective intermediate certificate authority in the chain of intermediate certificate authorities comprising:
      a respective intermediate certificate digitally signed by the intermediate certificate authority or the root certificate authority that is immediately higher in the chain of intermediate certificate authorities than the respective intermediate certificate authority; and
      a respective validation time period indicating a range of times when the respective intermediate certificate authority is permitted to digitally sign intermediate certificates and end entity certificates, the respective validation time period of the respective intermediate certificate authority including the validation time period of each intermediate certificate authority that is lower in the chain of intermediate certificate authorities than the respective intermediate certificate authority;
    generating a certificate revocation list for the chain of intermediate certificate authorities;
    generating from the lowest intermediate certificate authority in the chain of intermediate certificate authorities, a plurality of end entity certificates, each end entity certificate of the plurality of end entity certificates digitally signed by the lowest intermediate certificate authority in the chain of intermediate certificate authorities, and
    after the respective validation time period of the lowest intermediate certificate authority in the chain of intermediate certificate authorities has elapsed, adding, by the data processing hardware, to the certificate revocation list, one or more of the plurality of end entity certificates generated from the lowest intermediate certificate authority in the chain of intermediate certificate authorities.

13. The system of claim 12, wherein the operations further comprise, when every end entity certificate digitally signed by a respective intermediate certificate authority in the chain of intermediate certificate authorities has been added to the certificate revocation list and the current time is at or after an end of the respective validation time period of the respective intermediate certificate authority:
    removing each of the plurality of end entity certificates from the certificate revocation list; and
    adding the respective intermediate certificate associated with the respective intermediate certificate authority to the certificate revocation list.

14. The system of claim 12, wherein the operations further comprise, after the respective validation time period associated with a respective intermediate certificate authority in the chain of intermediate certificate authorities has elapsed:
    generating another intermediate certificate authority associated with a validation time period having a same duration as the validation time period associated with the respective intermediate certificate authority; and
    replacing the respective intermediate certificate authority with the other intermediate certificate authority in the chain of intermediate certificate authorities.

15. The system of claim 14, wherein the operations further comprise, after replacing the respective intermediate certificate authority with the other intermediate certificate authority, generating, by the data processing hardware, an end entity certificate digitally signed by the other intermediate certificate authority and not digitally signed by the respective intermediate certificate authority.

16. The system of claim 12, wherein each validation time period is associated with one of a day, a week, a month, a quarter, or a year.

17. The system of claim 12, wherein each end entity certificate does not have an expiration time.

18. The system of claim 12, wherein the operations further comprise:
    determining that a respective end entity certificate of the plurality of end entity certificates is compromised; and
    adding the respective end entity certificate to the certificate revocation list.

19. The system of claim 12, wherein each intermediate certificate authority is associated with a unique key derived from a common seed value.

20. The system of claim 19, wherein each unique key is derived using a Key Derivation Function.

21. The system of claim 12, wherein the respective validation time period of the respective intermediate certificate authority is shorter than the validation time periods of any intermediate certificate authorities higher in the chain of intermediate certificate authorities than the respective intermediate certificate authority.

22. The system of claim 12, further comprising:
    determining that a respective end entity certificate of the plurality of end entity certificates has been rotated; and
    adding the respective end entity certificate to the certificate revocation list.

* * * * *